United States Patent [19]

Davis et al.

[11] 4,327,021
[45] Apr. 27, 1982

[54] PVC PLASTICIZED WITH DICYCLOHEXYLBIPHENYL AND PRIMARY PLASTICIZER

[75] Inventors: Brian C. Davis, Wilmington, Del.; Robert P. Bryer, Kennett Square, Pa.

[73] Assignee: Suntech, Inc., Philadelphia, Pa.

[21] Appl. No.: 209,446

[22] Filed: Nov. 24, 1980

Related U.S. Application Data

[63] Continuation-in-part of Ser. No. 74,024, Sep. 10, 1979, abandoned, which is a continuation-in-part of Ser. No. 821,012, Aug. 1, 1977, Pat. No. 4,167,504.

[51] Int. Cl.$^3$ .......................... C08K 5/12; C08L 27/06
[52] U.S. Cl. .................................... 524/297; 524/486; 525/1
[58] Field of Search .................................. 260/31.8 H

[56] References Cited

U.S. PATENT DOCUMENTS

| 2,115,524 | 4/1938 | Hochwalt | 260/33.6 R |
| 2,172,391 | 9/1939 | Krase | 260/33.6 R |
| 2,263,448 | 11/1941 | Smith | 260/33.6 R |
| 2,615,858 | 10/1952 | Winkler | 260/31.8 H |
| 2,925,398 | 2/1960 | Coran | 260/33.6 |
| 4,167,504 | 9/1979 | Davis | 260/33.6 |

Primary Examiner—C. A. Henderson
Attorney, Agent, or Firm—J. Edward Hess; Donald R. Johnson; Paul Lipsitz

[57] ABSTRACT

In the process of plasticizing polyvinylchloride, the improvement of using dicyclohexylbiphenyl as a secondary plasticizer.

3 Claims, No Drawings

PVC PLASTICIZED WITH DICYCLOHEXYLBIPHENYL AND PRIMARY PLASTICIZER

This application is a continuation-in-part of Ser. No. 74024, filed Sept. 10, 1979 (abandoned) which is a continuation-in-part of Ser. No. 821,012 filed August, 1977, now U.S. Pat. No. 4,167,504 which issued Sept. 11, 1979.

BACKGROUND OF THE INVENTION

Alkylbiphenyl compounds are known in the art for use as plasticizers (U.S. Pat. No. 2,172,391 and U.S. Pat. No. 2,115,524). Polycyclohexylbiphenyls containing at least three cyclohexyl groups are disclosed as plasticizing agents in U.S. Pat. No. 2,263,448. Partially hydrogenated polyphenyls are disclosed as plasticizers for vinyl polymers in U.S. Pat. No. 2,115,524 and U.S. Pat. No. 2,925,398. Partial hydrogenation (generally, at least about 20%) of a polyphenyl, such as terphenyl, results in a mixture comprised of monocyclohexylbiphenyl, dicyclohexylbiphenyl, and other terphenyl derivatives. Such mixtures are used commercially as PVC plasticizers.

One of the problems associated with all plasticizing materials is that of compatibility with the substrate into which it is milled. It is extremely important that the plasticizers remain in the treated material and not bleed to the surface and evaporate on aging or otherwise be removed from a complete distribution throughout the plastic. It has now been found that by use of a highly specific dialkyl biphenyl as plasticizer, improved compatibility with polyvinylchloride resins is obtained, particularly when used as a secondary plasticizer.

SUMMARY OF THE INVENTION

In accord with the invention, polyvinylchloride resins are plasticized with a plasticizing amount of a primary plasticizer and dicyclohexylbiphenyl as secondary plasticizer. Such secondary plasticizer will be preferably the composition obtained by alkylation of biphenyl with cyclohexene to give dicyclohexylbiphenyl.

DETAILED DESCRIPTION OF THE INVENTION

The preparation of the dicyclohexylbiphenyl composition is straight-forward and may employ the well known Friedel-Crafts synthesis using an aluminum chloride catalyst and using pseudocumene saturated with dry HCl as the solvent medium. In general a cyclohexene to diphenyl ratio of greater than 1:1, preferably 2:1 or higher will be used and the derived fraction of predominently dicyclohexylbiphenyl will be separated. A preferred means for such separation is simple distillation.

Plasticizing vinyl resins with one or more plasticizers is, of course, well known in the art. One of the most commonly used primary plasticizers for vinyl resins such as polyvinylchloride is dioctylphthalate (DOP). This primary plasticizer, however, is quite expensive and it is often desirable to use somewhat less than the usual amount and employ a secondary plasticizer of lower cost. Of course, the secondary plasticizer must not degrade the resin. The plasticizing amount of the primary plasticizer will depend upon the end product use, but in general, the primary plasticizer in a resin will be from about 10 to about 80 parts per one hundred parts of resin. The amount of secondary plasticizer has no lower limit since any amount added will be useful, but of course, the amount used will be determined by its cost-effectiveness. From a practical standpoint, the lowest amount of dicyclohexylbiphenyl secondary plasticizer will be such as to replace about 10% of the primary plasticizer. The upper limit of dicyclohexylbiphenyl which will be used will generally be up to about 40% replacement of the primary plasticizer.

The dicyclohexylbiphenyl plasticized resin is very resistant to loss of plasticizer as the plasticized material ages. This is clearly evident from the data of Table I where aged and unaged physical properties are compared on PVC formulated as shown in the Table with each of monocyclohexylbiphenyl, dicyclohexylbiphenyl and the commercially available hydrogenated terphenyl (Monsanto's "HB-40"). Properties are quite similar for the same replacement levels before and after aging, but the dicyclohexylbiphenyl treated resin is unexpected superior in showing superiority in important properties.

It is understood that of the parameters for determining effectiveness of a plasticizer, elongation and modulus are very important. Also, weight loss on aging is important as this reflects loss of plasticizer by evaporation. Now, referring to the following Table where the data has been taken from Table I it will be seen that the PVC plasticized with the dicyclohexylbiphenyl is unexpectedly superior as shown by comparing the aged properties with the unaged properties of elongation, modulus and weight loss where 28% additive is used as a secondary plasticizer.

|  | Plasticizer | | |
|---|---|---|---|
|  | Cyclohexylbiphenyl | | |
| Parameter | Mono | Di | "HB-40" |
| Elongation(%) | | | |
| Unaged | 400 | 350 | 375 |
| Aged | 325 | 375 | 325 |
| % Retention* | 81 | 107 | 87 |
| Modulus (S-300) | | | |
| Unaged | 1,700 | 2,100 | 1,950 |
| Aged | 2,250 | 2,150 | 2,275 |
| % of initial* | 132 | 107 | 117 |
| Weight Loss(%) | 8.4 | 0.8 | 9.0 |

*Calculated from above data

Thus, the sample with the dicyclohexylbiphenyl retained 107% of its elongation vs. 81% for the mono-isomer and 87% for the commercial "HB-40" product. Clearly, the dicyclohexylbiphenyl is superior in elongation. The dicyclohexylbiphenyl-plasticized PVC showed an aged modulus of only 107% of its initial unaged value, while the mono-isomer was 132% and thus much stiffer (less plasticized) as was the "HB-40" (117%). Also, the weight loss of the dicyclohexylbiphenyl plasticized PVC was negligible, while the other examples showed significant loss (8.4% for the mono-isomer and 9.0% for "HB-40").

TABLE I

| | PVC Formulations (phr) | | | |
|---|---|---|---|---|
| Sample | Monocyclohexylbiphenyl | "HB-40" | | Dicyclohexylbiphenyl |
| (PVC) (Geonioz) | 100 | 100 | 100 | 100 |
| Stearic Acid | 0.6 | 0.6 | 0.6 | 0.6 |
| Epoxide Stabilizer | 7.0 | 7.0 | 7.0 | 7.0 |
| DOP | 42.0 | 14.0 | 42.0 | 42.0 |

TABLE I-continued

| Sample | PVC Formulations (phr) | | | |
|---|---|---|---|---|
| | Monocyclohexylbiphenyl | "HB-40" | Dicyclohexylbiphenyl | |
| Secondary Plasticizer | 28.0 | 56.0 | 28.0 | 28.0 |

TABLE VI

| | Properties of Formulations | | | |
|---|---|---|---|---|
| DOP Replacement, % | 40 | 80 | 40 | 40 |
| Unaged Properties | | | | |
| Tonsile, psi | 2100 | 2235 | 2250 | 2300 |
| Elongation, % | 400 | 325 | 375 | 350 |
| Modulus, S-300 | 1700 | 2200 | 1950 | 2100 |
| Hardness, Shore A | 72 | 73 | 75 | 73 |
| Age Properties, 46 Hrs/212F | | | | |
| Tonsile, psi | 2235 | 2625 | 2350 | 2300 |
| Elongation, % | 325 | 225 | 325 | 375 |
| Modulus, S-300 | 2250 | | 2275 | 2150 |
| Hardness, Shore A | 80 | 89 | 80 | 79 |
| Weight Loss, % | 8.4— | 13.7 | 9.0— | 0.8 |
| Est. D1500 Color | 1.0 | 1.0 | 1.0 | 1.0 |

The invention claimed is:

1. In the process of plasticizing a polyvinychloride resin with a primary and secondary plasticizer, the improvement of using dicyclohexylbiphenyl as the secondary plasticizer in an amount sufficient to replace from about 10% to about 40% of said primary plasticizer.

2. The process of claim 1 wherein the primary plasticizer is dioctylphthalate.

3. The process of claim 1 wherein the resin is polyvinylchloride and the primary plasticizer is dioctylphthalate.

* * * * *